UNITED STATES PATENT OFFICE.

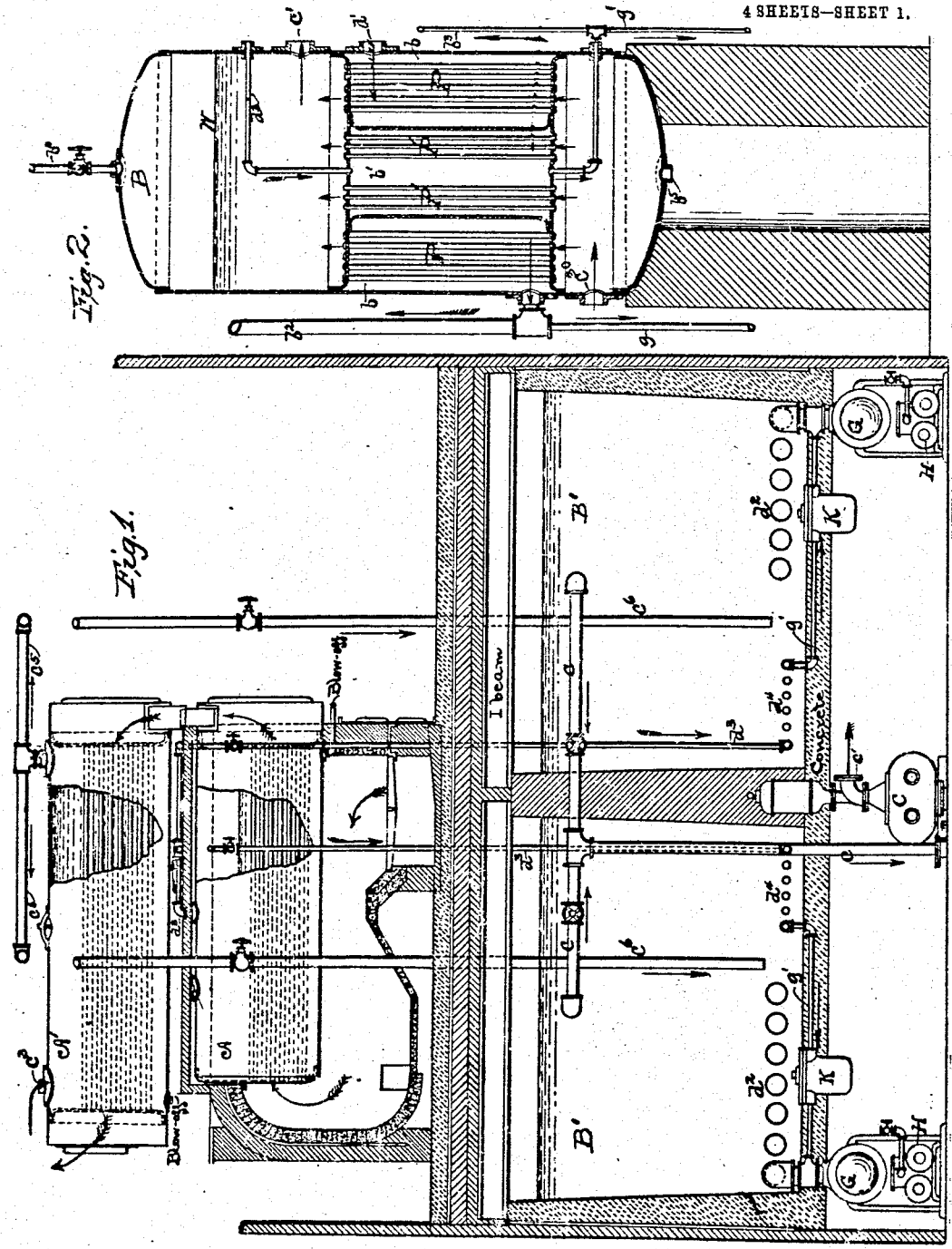

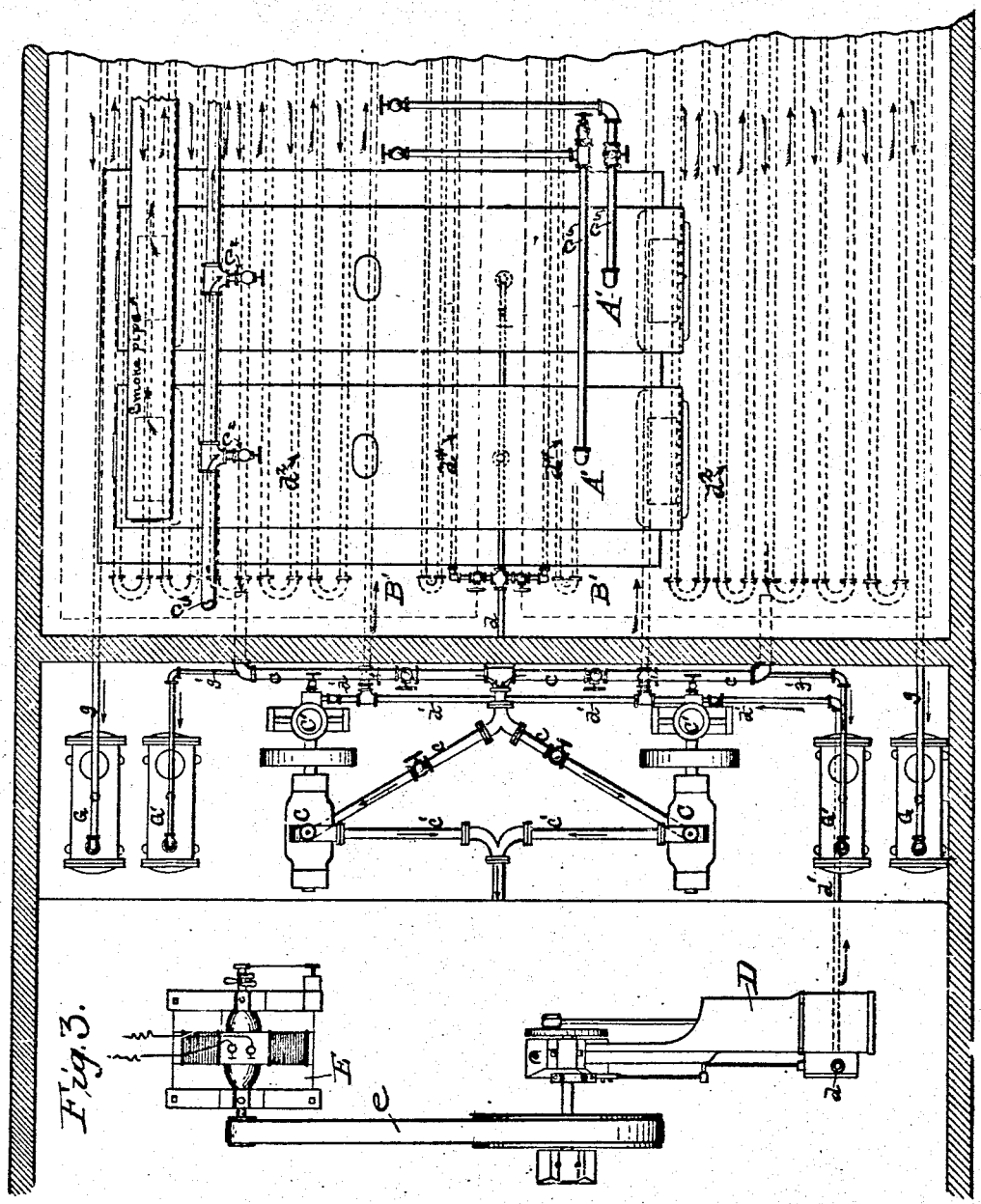

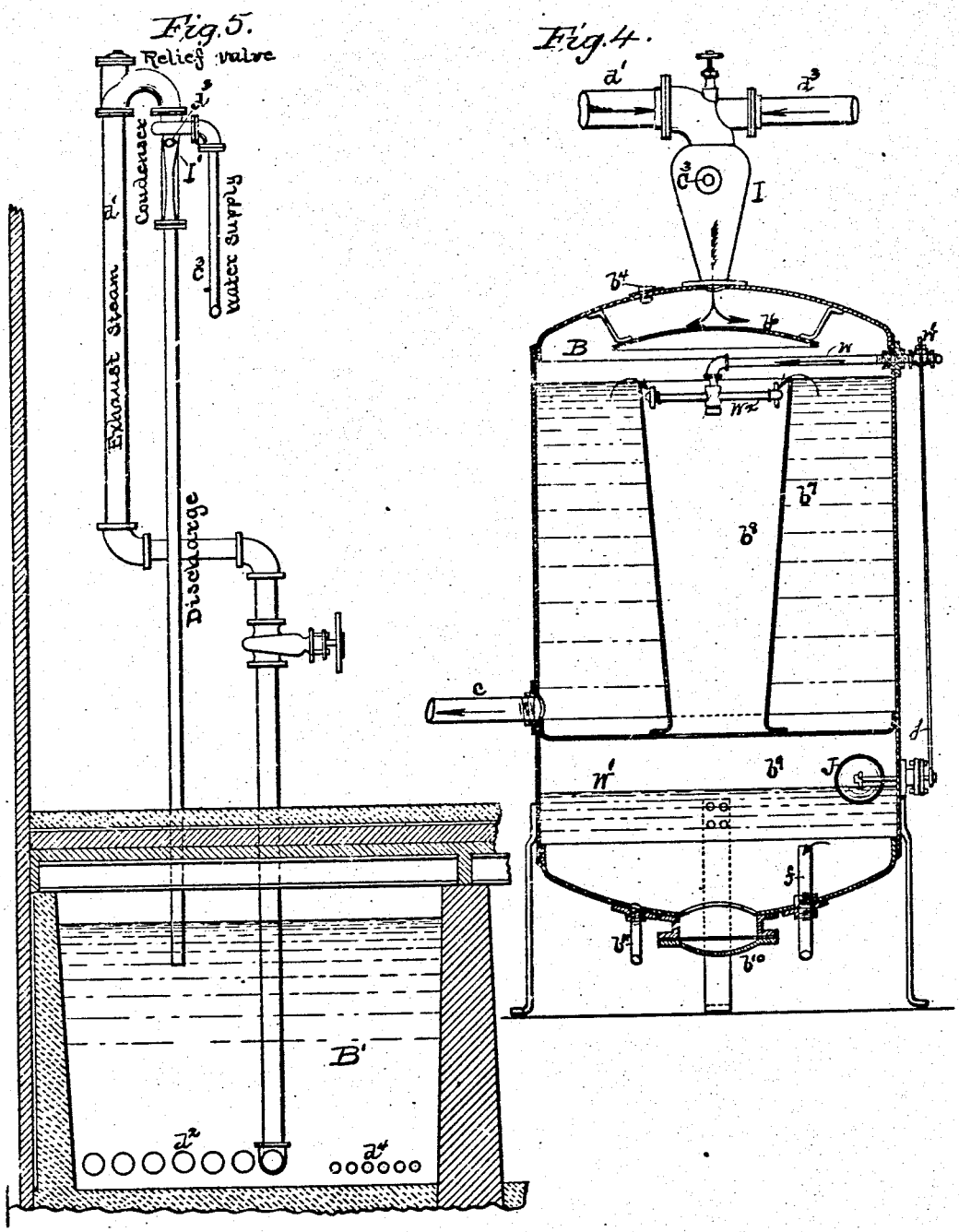

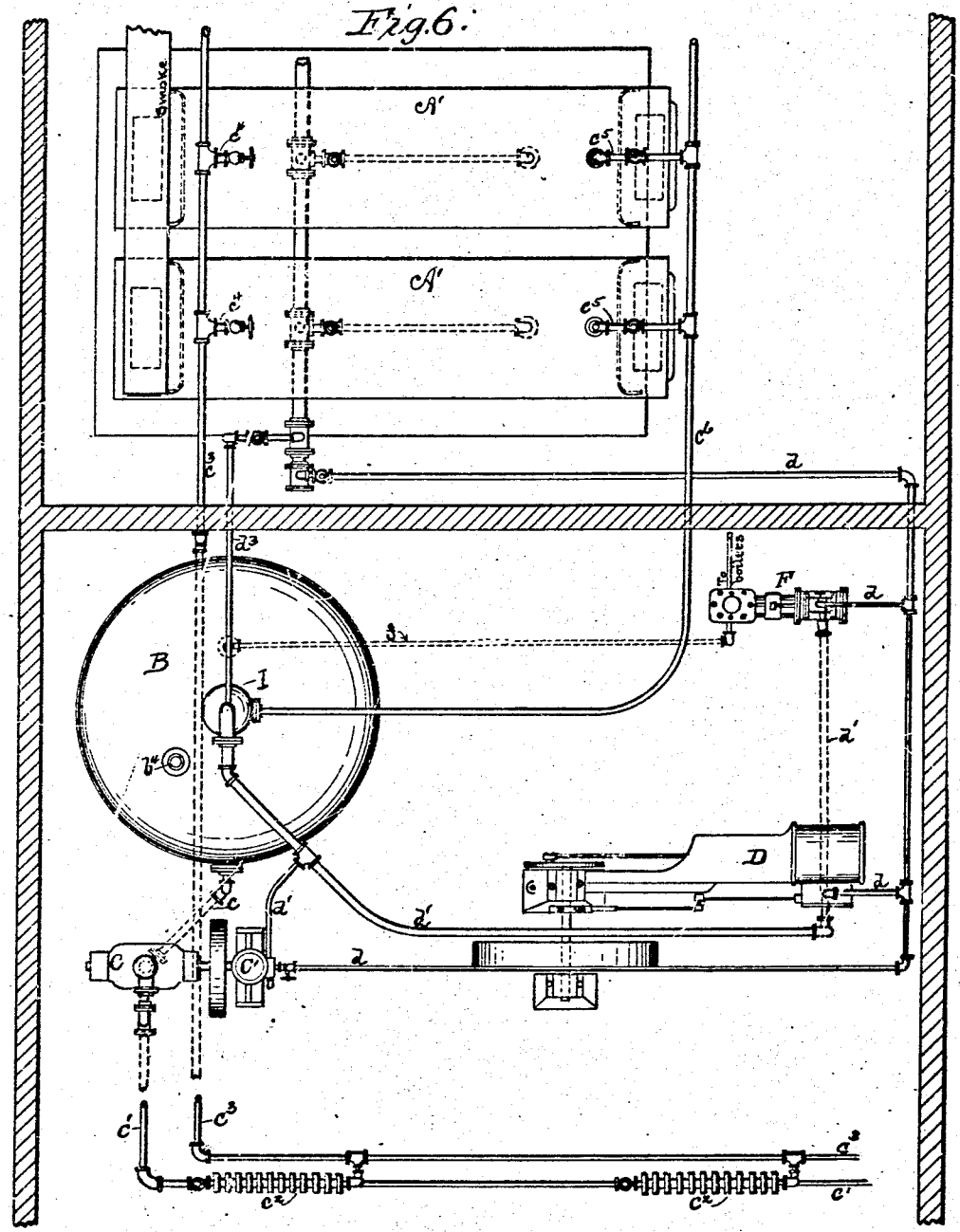

CASSIUS CARROLL PECK, OF ROCHESTER, NEW YORK.

APPARATUS FOR HOT-WATER HEATING SYSTEMS.

No. 918,901.  Specification of Letters Patent.  Patented April 20, 1909.

Application filed March 2, 1903. Serial No. 145,834.

*To all whom it may concern:*

Be it known that I, CASSIUS CARROLL PECK, residing at Rochester, in the county of Monroe and State of New York, have invented certain new and useful Improvements in Apparatus for Hot-Water Heating Systems, of which the following is a specification sufficient to enable others skilled in the art to which it appertains to make and use the same.

My invention relates to a hot water heating system in which necessary circulation of heated water is mechanically effected by some form of pump, or equivalent device.

It has for its objects the simplification of apparatus necessary for efficient, economical and convenient operation of such a system for serving buildings and districts with heat, the promotion of economy in operation, as also convenience, and improvement of conditions for maintaining desirable temperature in the heat circuit.

It comprises a source of steam heat, a hot water circuit of pipes in which is located a water storage tank, and means of heating water in the tank by special devices to the temperature required for circulation, this tank being made in duplicate for serving large systems, and when desirable, with a separate compartment for heating feed water for a boiler, or boilers, in such manner as to keep the fresh feed water from mingling with water of the heating circuit, together with means for effectively draining heating surface in the said tank, or tanks, and, in connection with the boiler, or with boilers, of the heating system, a secondary heater located in the hot water circuit for utilizing waste heat from furnace gases escaping from the boiler, or from the boilers, in raising the temperature of circulating water, the said heater being so arranged as to be filled with the water, and the water moving through the heater preferably in opposite direction to the course of the gases, all being essentially as hereinafter described and as shown in the accompanying drawings.

In the drawings Figure 1 is a vertical sectional elevation showing several parts of my invention, in which the boiler shell and the secondary heater shell, the circulating pump, the two receivers, each with its pump and steam trap, are shown in elevation, and brickwork of the boiler setting and walls of the power house and storage tanks and floor of power house and bottom of storage tank are shown in cross section. Fig. 2 is a vertical, central section of one form of combined storage and heating tank. Fig. 3 is a plan view of part of the boiler room and of the engine room of a power house containing apparatus embraced in my invention. Fig. 4 is a central, vertical section of a form of combined storage and heating tank suitable for a heating system of moderate size. Fig. 5 is a cross section of a combined storage and heating tank built of masonry, and of heating coils for a hot water circuit, and an "injector," or "siphon" condenser. Fig. 6 is a plan view of part of a power house containing a group of several parts of my invention.

In the several figures like parts are indicated by the same letters.

Referring to Fig. 1, A is a steam boiler which supplies the heating system with steam for heating the water circuit, and A' is a secondary heater for utilizing the otherwise waste heat of gases from said boiler in heating the circulating water of the heating system, the course of the gases being indicated by feathered arrows and of the water by unfeathered arrows.

In Figs. 3 and 6 two secondary heaters are shown, each being supposed to be mounted over a boiler to show that any number of boilers and heaters may be employed in a heating system.

In each of Figs. 2 and 4 B, indicates a different form of my combined storage and heating tank for the circulating system.

C in Fig. 1, shown in duplicate in Fig. 3, is a rotary pump of the Roots pattern, driven by a vertical engine C', for forcibly circulating the water of the heating system, it being understood that other forms of pump can be used for the same service. The suction pipe $c$ of said pump is connected with tank B and the delivery pipe of the system $c'$ supplies radiators $c^2$, the water returning either through pipe $c^3$ directly into tank B, or, first, into secondary heater A' through branch pipes $c^4$ and thence into tank B through branch pipes $c^5$ and main pipe $c^6$, these pipes being shown in Figs. 1, 3 and 6, and the delivery connection to the tank being shown at $c^3$, Figs. 2, 4 and 5.

D, Figs. 3 and 6, indicates a steam engine used for operating an electric generator E through belt $e$, as in Fig. 3, or for any other service.

F, Fig. 6, is a feed pump for supply of boilers A. The exhaust steam from engines C' and D and from feed pump F is delivered by pipes $d'$ to heating coils $d^2$ in the tank or tanks B, to steam space $b$, Fig. 2, or to one of the condensers shown in Figs. 4 and 5, for heating circulating water of the heating system. In the form shown in Fig. 5 said exhaust steam pipes lead to coils $d^2$ in storage tank B as well as to its condenser. Live steam pipe $d$ supplies feed pump F and engines C' and D, Fig. 6, and live steam pipes $d^3$ supplies coils $d^4$, Figs. 1 and 3, or if form shown in Fig. 2 is used said pipe $d^3$ leads to space $b'$, or in form shown in Fig. 4 to a condenser I, or in form shown in Fig. 5 to condenser I'. In any of these forms either exhaust steam or live steam may be used alone to heat the water in the storage tank. When tank B contains steam coils, as in Figs. 1, 3 and 5, the coils are placed at such a level that the water of condensation will flow by gravity into one or more receivers G, G', each receiver having a steam pump, as H, Fig. 1, for delivering the water of condensation either to boilers A, or to a tank, or elsewhere, the exhaust steam from said pumps being piped to tank B, or to a special feed water heater.

I and I', Figs. 4 and 5, are usual forms of jet condensers, being representative in character, as I do not confine myself to any particular form of condenser, and what will best suit one condition will not so well suit another condition, as illustrated in Figs. 4 and 5. The use of any form of jet condenser for heating the circulating water of a hot water circuit comes within the scope of my invention, and the attachment of a live steam pipe $d^3$ in conjunction with an exhaust steam pipe $d'$ is a part of my invention.

Referring now more in detail to the several parts, the secondary boiler or heater A', shown in elevation in Fig. 1, is the same in its general arrangement with respect to abstracting heat from the furnace gases as that shown in my pending application on apparatus for a hot water heating system, Serial Number 121,341 the difference consisting in the omission in the construction herein shown of all steam heating pipes in the supplementary heater and in entirely filling the heater with the circulating water of the heating system and forcing said water through the heater, preferably from the return pipe of the heating system, thence delivering the water into storage tank B to be there heated by steam to the required temperature for circulation. The present arrangement is better adapted for conditions of use in a large central station designed for district heating than the other.

Tank B with its heating appliances performs three important functions in the heating system, namely, it provides room for expansion of the circulating water, it heats said water to the temperature required by the heating circuit, and, in case of the masonry tanks, it gives storage for such amount of water as may be needed in utilizing for heating the hot water circuit practically all exhaust steam from engines and pumps connected with the heating station, and may also be used to store the heat of live steam where sufficient exhaust steam for the heating circuit is not available.

The tank shown in Fig. 2 is adapted for a relatively small plant, being compact and suited for use either with or without the gas heated receptacle A', the uppermost space or chamber of the tank B forming the initial and terminal point of circulation and containing all the live steam surface and all the exhaust steam surface required for bringing the circulating water to the temperature required by the heating circuit. In this form of tank shown in Fig. 2 the exhaust steam is admitted to compartment $b$ at connection $d'$ and surrounds the water filled pipes P, and live steam is admitted to compartment $b'$ through pipe $d^3$ and envelops water pipes P'. Water of condensation flows by gravity to a receiver by pipes $g$ and $g'$. A relief for surplus exhaust steam is supplied by pipe $b^2$ and circulation for live steam by pipe $b^3$ which is connected to some steam using apparatus, such as pumps, not only to effect circulation of steam in compartment $b$ but also to remove air which would otherwise collect in the compartment and reduce the efficiency of heating surface. In case no steam using apparatus is available pipe $b^3$ is valved so as to constantly discharge a little steam into the atmosphere. The space above water level W provides expansion room for the circulating water, and this space is vented to the atmosphere at pipe connection $b^4$. Water level W may be carried at any point above pipes P, P' compatible with allowing room for expansion of the circulating water. At $b^5$ is a connection for a drain pipe. The suction pipe $c$ of circulating pump C is connected to the upper portion of tank B at the flange marked $c'$, and return pipe $c^3$ of the heat circuit is connected to the lower section of the tank at flange marked $c^{30}$. The tank is given considerable elevation so as to have a good head of water over the valves of the pump to insure smooth and effective working, this being of special importance when carrying high temperature in the tank, as in heating buildings in severely cold weather. This applies with equal force to the other forms of tank B shown in the drawings, it being one of the essential points in my system wherein the tank embraces the functions of an expansion tank, a storage tank, and a chamber wherein the circulating water is heated to the temperature required for the heating circuit. When the weather is very cold it is absolutely necessary to carry temperatures well up toward the boiling point and consequently a considerable head of water is necessary above the circulating pump to prevent it from drawing vapor in place of water.

The form of tank shown in Fig. 4, is arranged for a somewhat larger heating system, and in addition to heating water of the heat circuit it provides for heating fresh feed water without allowing it to be carried into the circulation of the heating system, the solids in fresh water being thus prevented from being carried into the heat circuit. In this form of tank return water and steam of the heating system enter jet condenser I at connection $c^3$ and the steam condenses, and the water is heated by either exhaust steam supplied through pipe $d'$, or live steam through pipe $d^3$, or both. The water falls on a plate $b^6$ and is deflected into a compartment $b^7$, whence it overflows into the conical passage $b^8$ and then drops into chamber $b^9$ at the bottom of the tank, which is the chamber for the fresh water supply for the boilers. The normal water level in chamber $b^9$ is shown at $W'$. Fresh water is automatically supplied to chamber $b^9$ through pipe $w$ by a valve $w'$ in said pipe operated by float J through lever connection $j$. Pipe $w$ is fitted with a revolving, reaction head $w^2$ for distributing water over the walls of the conical passage $b^8$, so that in its downward course the water becomes heated both by vapor in the tank and by contact with the walls of the tank. As water accumulates in the heating system by condensation of steam mingled with it in the jet condenser the surplus overflows from compartment $b^7$ into chamber $b^9$, from whence it may be pumped into boilers A through suction pipe $f$. Manhole $b^{10}$ gives access to the whole interior of the tank. Sufficient steam is supplied to jet condenser I to heat the circulating water to the temperature required for the heat circuit. If sufficient exhaust steam is not supplied through pipe $d'$ the requisite addition of live steam is made through pipe $d^3$. The water, being thus properly heated for recirculation, is withdrawn from compartment $b^7$ through suction pipe connection $e$ connecting with pump C, and in this way a continuous round of circulation and heating is maintained. A drain pipe is shown at $b^{11}$.

In a large central heating system the duplicate tank, or reservoir, plan, shown in Figs. 1 and 3 or that shown in Fig. 5, is most advantageous, as there the arrangement meets in the compact, economical and simple manner the conditions governing heating on a large scale by water circulation. The reservoirs B' shown in these figures unitedly store in the water which they contain, all, or nearly all, the steam heat capacity of the boilers which supply heat to the system for such length of time as is needful for conserving said heat, or for supplying the heating system during night hours when engines and boilers are not in operation, the most of the necessary heat being usually supplied by exhaust steam from engines. If the plant were designed for heating only, and did not include engines, then the boiler capacity need be only such as to supply the amount of heat needed during 24 hours by uniform operation of the boilers day and night, as the tanks would act as a storage for extra heat produced during the night so that it could be used during the day, when the boiler capacity of itself might not be equal to heat requirements, thus fulfilling the same functions as those of storage batteries for electricity. Usually however this heating system will be combined with a steam power plant in which case the steam is first utilized for power and secondly for heating purposes, hence the plans show this latter arrangement, although my invention is equally applicable in either case. Where no engines are used live steam from boilers A is turned into pipes $d^3$, or into condenser I', the former being shown in Figs. 1 and 3 and the latter in Fig. 5, thus heating circulating water to the desired extent, the water of condensation being conducted into a receiver G, Figs. 1 and 3, and thence pumped back into boilers A by pump, or pumps, H, no trap being required between the receiver and heating coils shown in Figs. 1 and 3. Exhaust steam from the receiver pump, or pumps, is preferably utilized in a feed water heater. Where engines are employed for making electric current, as shown in Fig. 3, or for other purpose, steam produced in boilers A is first supplied through pipe $d$ to said engines, one being shown at D, Fig. 3, and the exhaust from these engines is discharged through pipes $d'$ into water heating coils $d^2$, Figs. 1 and 3, or into condensers I, or I', for heating the circulating water of the heating system. If the amount of exhaust steam is not sufficient to heat said water to required temperature, then live steam is turned on, as heretofore stated, to make up the necessary amount of heat. The water of condensation which forms in coils $d^2$ flows by gravity into one or more receivers G, through pipes $g$, Fig. 3, and is thence returned to boilers A by pump, or pumps, H automatically controlled by a float in, or attached to, each receiver. When water of the heating circuit is heated by jet condensers I, I', the volume of water is constantly increased in proportion to the weight of steam condensed. To prevent a surplus of water, and at the same time provide hot feed water for boilers A, water is taken from tank, or tanks, B, Figs. 5 and 6, by feed pump F, Fig. 6, and supplied to boilers as required.

The connection of feed pump F with tank B is shown in Fig. 6, this tank being intended to represent the same construction as that shown in central vertical section in Fig. 4.

I do not confine myself to the exact forms of condensers shown in Figs. 4 and 5, as any form which will effectively, and without objectionable noise, condense steam as it mingles with return water of the heating system at, or near, the storage tank, or tanks, B' will fulfil my object in heating the circulating water by direct steam contact.

The duplication of water and heat storage tanks B', as shown in Fig. 1, and indicated by broken lines in Fig. 3, one of two or more being also shown in Fig. 5, constitutes an improvement of importance in the practical operation of a large combined heating and power plant, as it provides better for storage of heat and maintaining desirable temperatures in the heating circuit at all hours of day and night than a single reservoir, or tank. Thus, if two tanks of suitable size be employed, each one being complete in itself, that is, having independent and sufficient appliances for supplying the heating circuit with water and heat, and being independently connected with said circuit, then either one or both the tanks are available for use at all times, and can be used to suit requirements either of storing heat from boilers or engines, or for dispensing heat through the circulating system. In district heating and electric lighting a power plant is usually installed to supply to the engines in the first instance the steam required for the circuit, or circuits, of heating pipes. The amount of steam which will be used in such engines will vary considerably during the operating hours of each day, and but little will be used during several hours of each night, hence it is important, especially during severely cold weather, not only to condense in tanks B' all steam used, but also to control the temperature of the hot water heating circuit so that a suitable delivery of heat shall be made throughout the whole extent of the heating system. This can best be effected by the use of two or more reservoirs. Thus, in the evening the amount of steam used by engines is usually large, and this can be employed to heat up to maximum temperature water in one or both reservoirs. During the night, say from midnight to 5 a. m., one of the reservoirs B' will supply what heat is needed for the pipe circuit, or circuits; then in the morning the reserve reservoir can be drawn on for quickly heating up the whole circulating system. During daylight hours either one or both reservoirs can be drawn on for the circulating water, and steam can be turned into one or both as needed. If the weather be very cold the reserve of heat in both reservoirs will be much reduced in getting buildings well warmed in the morning, after which there will be a gradual gain of water temperature in the reservoirs, supposing exhaust alone to be relied upon, and supposing that the amount of engine power has been so calculated as to afford nearly or quite the requisite amount of exhaust steam for imparting to the reservoirs necessary temperature throughout each 24 hour day in all but the coldest winter weather. It is evident that an exact balance between power requirements and heating requirements, so that there shall always be sufficient exhaust steam for heating and no excess, cannot be attained, for if there be sufficient exhaust steam in severe weather there must be an excess of steam in mild weather, provided the engine load remained constant. It is therefore practically necessary, from a commercial standpoint, to adjust the relative engine and heating load to just the relative engine and heating load to harmonize with the money returns obtainable from each, and these will not usually differ largely one from the other.

While two reservoirs are usually all that are required for controlling the temperature of circulating water, and retaining and dispensing heat with maximum economy, I do not confine myself strictly to two reservoirs or tanks, as sometimes three, or even four, will be still more advantageous, especially in very large heating systems. Different hours of the day require differing degrees of temperature in the heating circuit, and these requirements should be exactly observed, while at the same time storing any excess of heat or while drawing on reserve heat, and these conditions can best be met by having a sufficient number of reservoirs so the proper temperature can always be maintained in the particular reservoir which is being drawn upon.

I am aware that a single tank designed for storing the heat of exhaust steam from electric lighting engines has heretofore been proposed and used in connection with a hot water heating circuit, but heretofore a heater for both exhaust steam and live steam additional to, and exterior to, the storage tank has been required for heating water of the heat circuit steam passing first through the exterior heater. The combination of a single storage tank and a separate compound steam heater has not been satisfactory for the purpose of heat storage, and is not the equivalent of my invention, an essential feature of which is the combination in, or immediately connected with, a heat and water storage reservoir or tank of all heating appliances required for bringing the temperature of circulating water in the storage tank to the point required in the heating circuit so that no secondary steam heater is required, the tank being heated by either live steam or exhaust steam or simultaneously by both.

In a large central heating and power station the water storage reservoirs B' must have large total capacity, and must be well secured against loss of heat. These two conditions make it desirable to construct said reservoirs beneath the power house in manner practically as shown in Figs. 1, 3 and 5, in which boilers A are supposed to be set at about ground level. The division wall between the reservoirs is preferably made of Portland cement concrete, and side walls of the building are preferably lined with concrete with an inch between filled with asphaltum. The bottom is best made of 4" of concrete laid on well rammed earth with an inch of asphaltum and then about 6" of concrete. The top, or cover, can be satisfactorily constructed of expanded metal and concrete supported by I beams, or may consist of an arching of hard bricks, preferably glazed on edges exposed to hot vapor, and supported on I beams, which, on account of conditions tending to cause corrosion, it is desirable should be made of cast iron. The brick-work arching can also be made self-sustaining, so that no metal beams will be needed, in which case it is desirable to have the arches as nearly semicircular as practicable. If cover and side walls are of proper thickness very little heat will be lost, and sufficient storage capacity can be secured without special provision of ground, or floor space. I do not however confine myself to constructing the requisite reservoir capacity beneath the power house as it will sometimes be more convenient to use space under an adjoining building, or even yard space; the most essential point being that reservoirs shall be constructed under the ground level so as to secure protection of the earth against loss of heat and for sustaining the pressure of water on sides and bottom of reservoir.

An important economical feature of my invention is the use of return water of a hot water heating system to condense exhaust steam from engines. This is particularly applicable to conditions which obtain in factories, and is often advantageous both in cases where engines are run condensing in warm weather and non-condensing in cold weather, and where engines are run non-condensing the year around principally because the exhaust from said engines is required for heating during cold weather, the most gain occurring in the latter case. There is greatest advantage in case of factories so situated that water cannot be obtained for condensing except by use of a cooler tower, or equivalent device, for cooling condensing water, as a hot water heating system can then be utilized in cold weather for cooling condensing water, and the use of other means of cooling either wholly, or partially, discontinued. By a moderate increase of the amount of heat radiating surface in factories now heated by direct exhaust steam, engines can be run with 18" or 20" of vacuum in moderate winter weather, with reduction of vacuum to 14" or 16" in severe cold and windy weather, and at the same time enable buildings to be heated by hot water circulation more satisfactorily than by direct use of exhaust steam. In carrying out this system of condensing I do not confine myself to jet condensers shown in Figs. 4 and 5, as a surface style of condenser will serve equally well, this being illustrated in Fig. 2, where steam space b receives exhaust steam from engines and is condensed by water tubes P, the steam entering at connection c and the air pump being connected to pipe g'.

When one receiver, G, Fig. 3, is used for condensation from exhaust steam, and another receiver G' is used for condensation from live steam, it is not necessary to employ a trap, but when condensation from both live steam and exhaust steam is discharged into the same receiver a trap, K, Fig. 1, must be employed in the live steam line.

Having described my invention what I claim and desire to secure by Letters Patent is:—

1. In a hot water heating system the combination with a heating circuit, of a boiler having a fire space; a heater in said circuit adapted to receive waste products of combustion from the fire space after acting on the boiler and to impart heat therefrom to the water in said circuit; a separate closed expansion tank at the bottom of the system in said circuit adapted to receive water from said heater; and means for circulating the water through said circuit.

2. In a hot water heating system the combination with a heating circuit, of a boiler having a fire space; a heater in said circuit adapted to receive waste products of combustion from the fire space after acting on the boiler and to impart heat therefrom to the water in said circuit; a separate closed storage tank at the bottom of the system in said circuit having a water chamber and a separate steam compartment and adapted to receive water from said heater, and having a connection between its steam compartment and said boiler; and means for circulating the water through said circuit.

3. In a hot water heating system the combination with a heating circuit, of a boiler having a fire space; a heater in said circuit adapted to receive waste products of combustion from the fire space after acting on the boiler and to impart heat therefrom to the water in said circuit; a separate closed storage tank at the bottom of the system in said circuit having a water chamber and a separate steam compartment and adapted to receive water from said heater, and its said steam compartment having a connection with the exhaust of steam-operated machinery; and means for circulating the water through said circuit.

4. In a hot water heating system the combination with a heating circuit, of a boiler having a fire space; a heater in said circuit adapted to receive waste products of combustion from the fire space after acting on the boiler and to impart heat therefrom to the water in said circuit; a separate closed storage tank at the bottom of the system in said circuit having a water compartment adapted to receive water from the heater, and separate steam heating compartments, one of said steam compartments having a connection with said boiler, and the other with the exhaust of steam operated machinery, and means for circulating the water through said circuit.

5. In a hot water heating system, the combination with a heating circuit, of a boiler having a fire space, a heater in said circuit adapted to receive waste products of combustion from the fire space after acting on the boiler to impart heat therefrom to the water in said circuit, means for circulating the water through said circuit, a plurality of storage and expansion tanks each having a capacity sufficient to keep the circuit full and to supply a reserve of heated water, means for heating the water in said tanks, and means for connecting each tank with and disconnecting it from said heating circuit and from said heating means, whereby the water from a plurality of tanks may be mixed in different proportions.

6. In a hot water heating system, the combination with a heating circuit, of a boiler having a fire space, a heater in said circuit adapted to receive waste products of combustion from the fire space after acting on the boiler to impart heat therefrom to the water in said circuit, means for circulating water through said circuit, a plurality of storage and expansion tanks in said circuit, each having a capacity to keep the circuit full and to supply a reserve of heater water, each tank having a water chamber and a steam space, and means for connecting each tank with and disconnecting it from said heating circuit and from said boiler, whereby the water from a plurality of tanks may be mixed in different proportions as desired and delivered into the system.

CASSIUS CARROLL PECK.

Witnesses:
CHARLES L. WHITMORE,
WILLIAM W. WHITMORE.